United States Patent

[11] 3,586,169

[72] Inventor Duane Lucien Hultquist
    Duluth, Minn.
[21] Appl. No. 848,303
[22] Filed Aug. 7, 1969
[45] Patented June 22, 1971
[73] Assignee Duluth Filter Company
    Duluth, Minn.

[54] OIL-FILTERING UNIT
    8 Claims, 4 Drawing Figs.
[52] U.S. Cl. .................................................. 210/90,
    210/149, 210/167, 210/186, 210/259, 210/258
[51] Int. Cl. ....................................................... B01d 35/14,
    B01d 35/18
[50] Field of Search .......................................... 210/320,
    323, 301, 300, 186, 167, 258, 259, 261, 262, 86,
    190, 149, 168

[56]        References Cited
        UNITED STATES PATENTS
2,738,877   3/1956   Beach........................... 210/259 X
2,788,126   4/1957   Gardes et al. ................ 210/262 X
3,246,757   4/1966   Martin.......................... 210/86

Primary Examiner—Samih N. Zaharna
Attorney—Larson, Taylor & Hinds

ABSTRACT: A compact filtering unit is provided which includes a reservoir tank divided into three compartments by a first and second spaced baffle plates. The first compartment includes a strainer basket for receiving oil to be filtered, oil from the first compartment, after passing through the strainer basket, flowing over the first baffle plate into the second compartment. Oil in the second compartment is pumped through a lower outlet to a filter tank mounted atop the reservoir tank, the filtered oil thence passing to the third compartment. The height of the second baffle plate is less than that of the first so that, upon obstruction of the filter tank, oil from the second compartment can flow over the second plate directly into the third compartment thereby bypassing the filter tank and eliminating any shortage of oil in the line.

PATENTED JUN 22 1971

INVENTOR
DUANE L. HULTQUIST

BY Larson and Taylor
ATTORNEYS

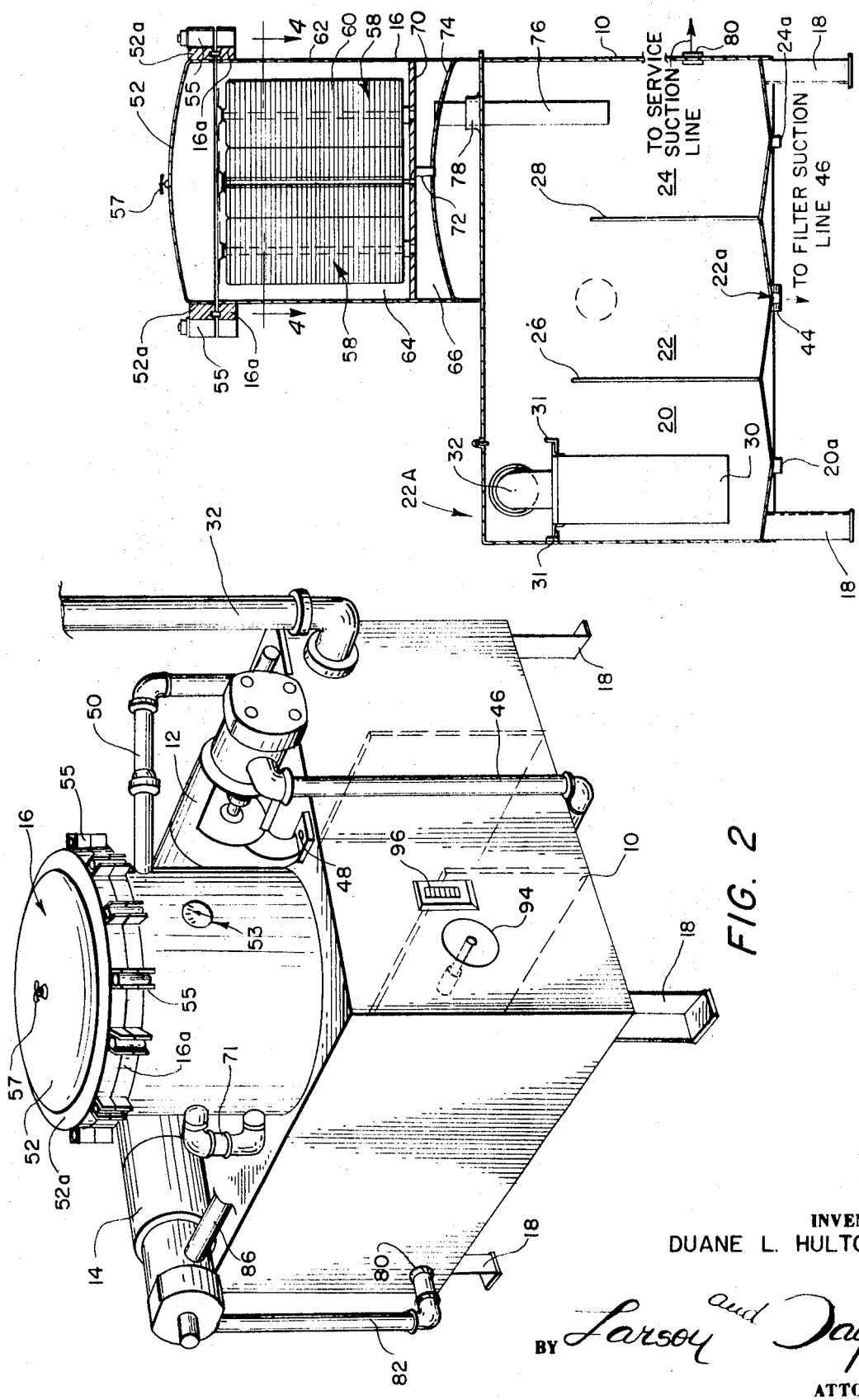

3,586,169

OIL-FILTERING UNIT

FIELD OF THE INVENTION

The present invention relates to filtering systems and, more particularly, to filtering systems wherein said used oil is continuously piped from a device being serviced, filtered, and returned to the device being serviced.

BACKGROUND OF THE INVENTION

Although oil-filtering systems take a number of forms, systems providing comprehensive filtering generally include a number of separate units for performing various functions such as heating of the oil prior to filtering and pumping of the oil throughout the system, in addition to the filtering unit itself. The effective filtering of oil from machines such as large crushers used in mining operations presents a number of specialized problems and places a number of particular demands on a filtering system. For example, the used oil from such machines usually contains large contaminant particles therein which may tend to clog, or otherwise disable a conventional system. Further, the space requirements for the filtering systems used in such operations are generally highly restrictive. Thus, a suitable filtering system must provide effective filtering despite the problems presented by the bulky contaminants in the used oil and yet be compact so as to conform with space requirements. Conventional systems do not, in general, meet these tests.

SUMMARY OF THE INVENTION

In accordance with the present invention a self-contained filtering unit is provided which is very compact yet provides extremely effective filtering. Although the filtering unit is particularly adapted for use with large-scale mining machines it will be appreciated that the unit is not limited to such use.

In accordance with a presently preferred embodiment, the filter unit includes a reservoir tank divided into three compartments by first and second baffle plates. The first or inlet compartment includes a strainer basket which provides rough filtering of the oil to be filtered. Oil from the first compartment flows over the first baffle plate into the second compartment, the baffle plate providing separation of the larger contaminant particles which settle out to the bottom of the first compartment. The oil is heated in the second compartment and pumped by a filter pump mounted on the reservoir tank into a filter case or tank also mounted on the reservoir tank. Clean oil from the filter case is returned to the third or sump compartment from which the oil is pumped by a service pump, also mounted on the reservoir tank, back to the device being serviced. The height of the second baffle plate is less than that of the first baffle plate and thus should an obstruction occur in the filter case, the oil will rise in the second compartment and flow over the second baffle plate into the third compartment, thus eliminating any oil shortage in the line.

Other features and advantages of the filtering unit of the invention will be set forth in or apparent from the detailed description of a presently preferred embodiment found hereinbelow.

BRIEF DESCRIPTION OF THE DRAWINGS

FIG. 2 is a perspective view of the embodiment of FIG. 1 taken in the direction of arrow A in FIG. 1 and drawn to a reduced scale;

FIG. 3 is a sectional view to a reduced scale of the embodiment of FIG. 1 with external portions of the unit omitted for purposes of clarity.

DESCRIPTION OF THE PREFERRED EMBODIMENT

Figure 1:
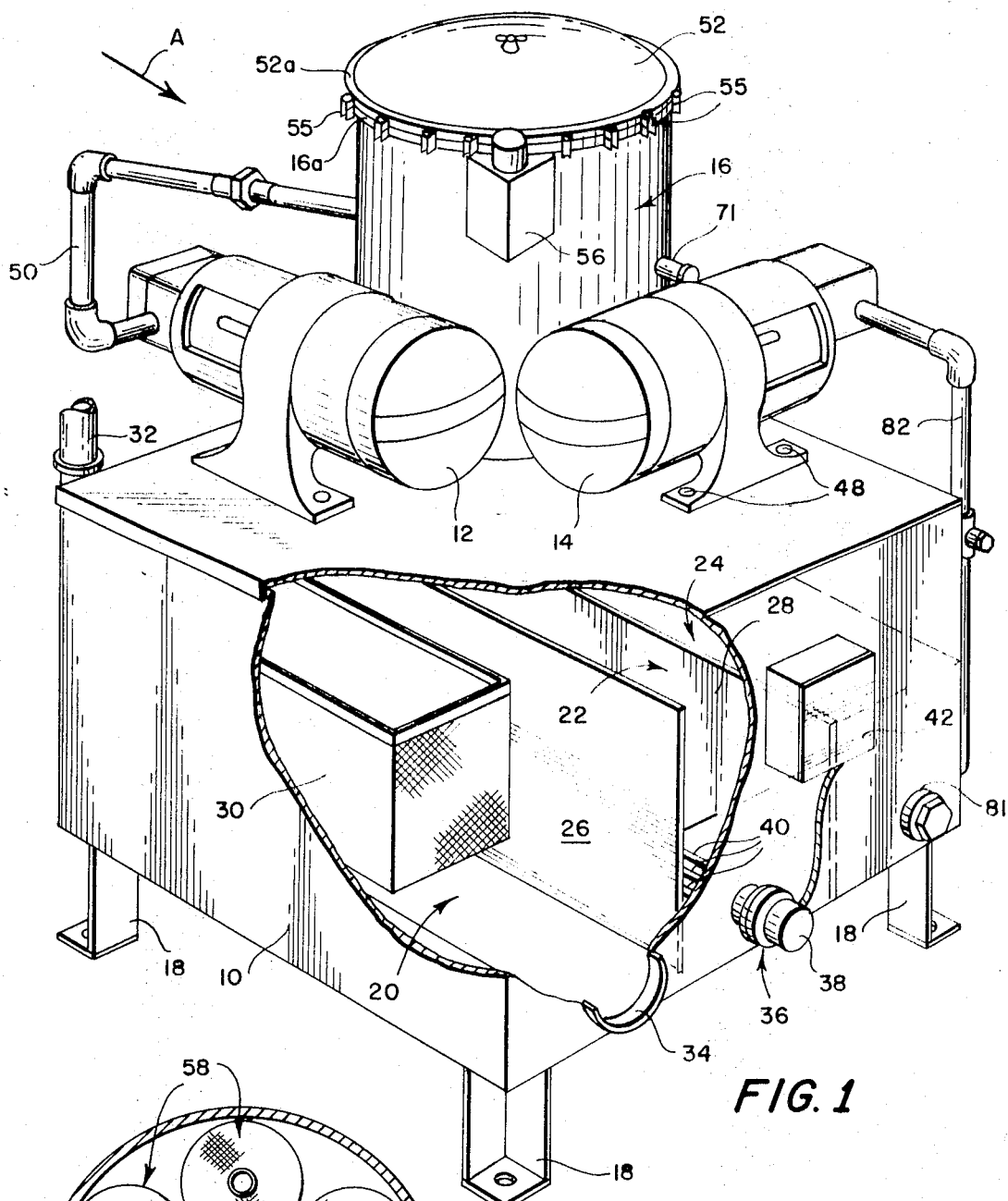
FIG. 1 is a perspective view of a presently preferred embodiment of the invention, partially broken away for purposes of illustration.
Figure 4:
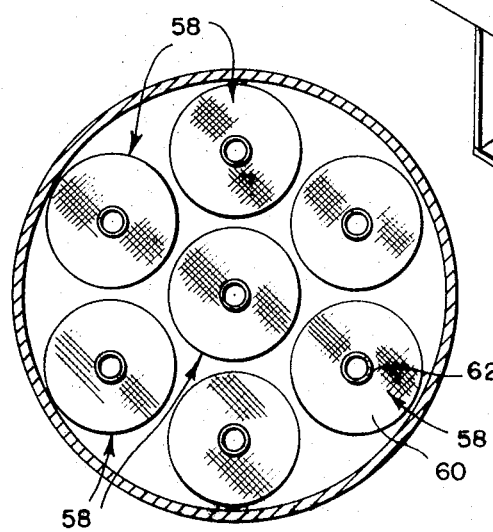
FIG. 4 is a sectional view taken generally along line 4—4 of FIG. 3 and drawn to an enlarged scale.

Referring particularly to FIGS. 1 and 2, a presently preferred embodiment of the invention is shown which includes the following basic elements; a reservoir tank 10, a filter pump 12, a service pump 14, and a filter tank or case 16.

Reservoir tank 10 is generally square in shape and is supported from the floor by four relatively short legs 18 positioned at the corners thereof. Tank 10 basically comprises three compartments, namely, a first or inlet compartment 20, a second or heating compartment 22, and third or sump compartment 24 (see also FIG. 3). These compartments are formed within tank 10 by first and second baffle plates 26 and 28. Baffle plate 26 also serves in separating large particles in the oil to be filtered which particles settle out at the bottom of the compartments. Plate 28 also performs this function under certain conditions described hereinbelow.

The first compartment 20 includes a rectangular strainer basket 30 therein one end of which is positioned adjacent an inlet pipe 32 for receiving oil to be filtered. Pipe 32, which is connected to the device to be serviced, extends through the wall of tank 10 and opens into basket 30 as shown in FIG. 3. Basket 30 is constructed of one-half inch expanded metal and includes an 80-mesh screen liner. A basket track 31 (see FIG. 3), formed by first and second spaced brackets, extends between opposed walls of tank 10 for supporting basket 30 within compartment 20. Strainer basket 30 provides coarse filtering of the oil which thence passes through basket 30 into the remainder of compartment 20 from there over baffle plate 26 into compartment 22. Compartment 20 includes an upper access or inspection cover 22a which may be removed for inspection purposes and a cleanout orifice 34 located at a lower level thereof. As shown in FIG. 3 the floor of compartment 20 (as well as of compartments 22 and 24) is sloped toward the middle so that residual particles will settle out and be collected in this area. The residue collected can be drained through associated drain outlets 20a, 22a, and 24a.

Compartment 22 includes an electrical immersion heater unit 36 comprising a heater portion 38 mounted on one wall of tank 10 and a plurality of heating elements 40 (portions of which are shown in FIG. 1). Heating element 40 extend a substantial extent into compartment 22 and provide heating of the oil received therein. It is noted that the entire heating unit 36 can be removed for inspection and cleaning. An outlet 44 in the bottom of compartment 22 (see FIG. 3) provides a connection to a filter suction pipe or line 46 which communicates with filter pump 12 (see FIG. 2). Filter pump 12 may for example be a 7.5-horsepower pump which provides a 65 gallons per minute output. Filter suction line 46 extends from under tank 10 and along one side thereof is connected to pump 12 above the upper surface of tank 10. Pump 12 is mounted on the upper surface of tank 10 by suitable means such as bolts 48. Pump 12 is connected to filter tank 16 through a filter supply pipe or line 50 which enters filter tank 16 at an upper level therein.

Filter tank 16 is generally cylindrical in shape and includes a cover 52 which seals the tank 16 against loss of pressure. A pressure gauge 53 (see FIG. 2) is located on the side of tank 16 to provide an indication of the pressure within the tank 16. A temperature gauge (not shown) provides an indication of the temperature inside the tank 16. Cover 52 includes a peripheral flange 52a which mates with a corresponding flange 16a on tank 16. A gasket 54 located between flanges 52a and 16a seals the tank 16 against pressure loss. Cover 52 is secured to tank 16 by a series of bolt arrangements 55 located in spaced relationship about the periphery of tank 16. Removal of cover 52 is controlled by a cam-actuated cover hinge 56 (see FIG. 1). A vent value 57 is located in the top of cover 52.

Tank 16 includes a series of filtering elements 58 located therein. In the embodiment shown, seven such elements 58 are utilized, six of which are circumferentially spaced about the inner wall of tank 16 and one of which is located in the center thereof. Filtering elements 58 each comprise a filter cartridge 60 and a central post 62 of tubular construction. Filter tank 16 includes an upper chamber 64, in which filtering elements 58 are located, and a lower chamber 66. Tank 16 is divided into chambers 64 and 66 by a post plate 70, filter elements 58 being supported within chamber 66 on post plate 70. A bypass pipe 71 (see FIG. 2) with suitable control valves (not shown) provides means for draining upper chamber 66 for preventing damage to the system for cold starting. Filtered oil collects in the central tubes 62 within filter elements 58, which tubes 62 exit through plate 70 and open into lower chamber 66. A stay post 72 is supported by a curved plate 74 within lower chamber 66 and a filter outlet pipe 76 extends through a breather element 78 into tank 10. Filter outlet pipe 76 connects lower chamber 66 with sump compartment 24 and extends a substantial extent into tank 10 as shown.

Sump compartment 24 includes an outlet 80 (see FIGS. 1 and 3) which opens into a suction pipe or line 82 (see FIGS. 1 and 2) communicating with service pump 14. A cleanout orifice 81 is positioned at a lower level in a wall of tank 10 which forms compartment 22. Service pump 14 is mounted on the upper surface of tank 16 and includes an outlet pipe or line 86 (see FIG. 2) which is connected to the device to be serviced. Service pump 16 is preferably the same type of pump as filter pump 12.

As shown in FIG. 2, a high- and low-level oil alarm 94 is located in a wall of tank 10 which forms a portion of compartment 24. A sight glass 96 is located in a portion of the same wall adjacent compartment 24.

As can best be seen in FIG. 3 the height of the baffle plate 26 between compartment 20 and 22 is greater than that of baffle plate 28 between compartments 22 and 24. The reason for this is that should an obstruction occur in the filter tank 16 the oil in compartment 22 will rise to a level where the oil spills over baffle plate 28 into compartment 24. In these circumstances the filter tank 16 will be completely bypassed and any oil shortage in the line will be eliminated.

Considering briefly the operation of the filtering system described hereinabove, oil from the device being serviced enters tank 10 from pipe 32 and passes through strainer basket 30 into the inlet compartment 20. As the level of the oil rises the oil spills over baffle plate 26 into heating compartment 22. Strainer basket 30 provides some rough filtering of the oil as does baffle plate 26 which, as stated, causes settling out of the heavier particles in the oil to be filtered. The oil is heated in compartment 22 by heating unit 36 and is thence pumped by filter pump 12 through filter suction line 46 into filter tank or case 16. Heated oil entering filter case 16 is filtered by filter elements 58 and passes through filter outlet pipe 76 to sump compartment 24. The oil is then pumped by service pump 16 through line 86 to the device being serviced.

It is noted that although the filtering system provided is a complete self-contained unit the system is also relatively very compact. Considering an exemplary unit, the tank is approximately 4 feet on a side whereas the total height of the unit is 6 feet. A unit constructed in accordance with the present invention requires only approximately one-third of the floorspace required by conventional units presently in use.

Although the invention has been described in detail with respect to an exemplary embodiment thereof, it will be understood by those of ordinary skill in the art that variations and modifications may be effected within the scope and spirit of the invention.

I claim:

1. A filtering unit for filtering used oil from a device being serviced comprising a reservoir tank, at least one baffle plate for dividing said tank into at least first and second compartments, strainer means located in said first compartment for receiving oil to be filtered and for providing coarse filtering of the oil to be filtered, said first compartment being enclosed on all sides except that formed by said at least one baffle plate so that oil filtered by said strainer means flows over said baffle plate into said second compartment, heating means for heating the oil in said second compartment comprising at least one heating element extending into said second compartment, a filter tank mounted on top of said reservoir tank, first pump means mounted on top of said reservoir tank for pumping oil from said second compartment to said filter tank, and second pump means mounted on top of said reservoir tank for pumping filtered oil back to the device being serviced.

2. A filtering unit as claimed in claim 1 wherein said at least one baffle plate comprising first and second spaced baffle plates for dividing said reservoir tank into first, second and third compartments, said unit further comprising means for interconnecting said filter tank and said third compartment, said second pump means pumping oil from said third compartment back to the device to be serviced.

3. A filtering unit as claimed in claim 2 wherein said strainer means comprises a strainer basket mounted in spaced relationship to the bottom of said first compartment, said unit further including an inlet pipe extending through a wall of said reservoir tank and opening into said strainer basket.

4. A filtering unit as claimed in claim 3 further comprising an outlet in the bottom of said second compartment through which oil from said second compartment is pumped to said filter tank and an inlet at an upper level of said filter tank for receiving oil pumped from said second compartment.

5. A filtering unit as claimed in claim 4 wherein said filter tank includes a plurality of filtering elements therein, each element comprising a filter cartridge and a central tubular member, said filter tank further including a support plate for supporting said filtering elements and for dividing said tank into first and second chambers, said central tubular members opening into said second chamber and said means for interconnecting said filter tank and said third compartment comprising a generally vertical pipe communicating at one end thereof with said second chamber and extending through the upper surface of said reservoir tank.

6. A filtering unit as claimed in claim 5 wherein said reservoir tank is substantially square in shape and said strainer basket and said compartments are substantially rectangular in shape, said unit further comprising high- and low-level alarm means, thermostat means for controlling said heating means and pressure gauge means mounted on said filter tank for indicating the pressure within said filter tank.

7. A filtering unit as claimed in claim 2 wherein the height of said second baffle plate is less than the height of the first baffle plate so that, upon obstruction of said filter tank, oil from said second compartment can flow over said second baffle plate into said third compartment and thus bypass said filter tank.

8. A filtering unit for filtering used oil from a device being serviced comprising a tank, first and second spaced baffle members for dividing said tank into first, second and third compartments, an inlet to said first compartment for receiving contaminated oil, oil from said first compartment flowing over said first baffle member into said second compartment, a filtering device, means for pumping oil from said second compartment into said filtering device, means for interconnecting said filtering device and said third compartment, and means for returning oil from said third compartment to the device being serviced, the height of said second baffle member being less than the height of the first baffle member so that, upon obstruction of said filtering device, oil from said second compartment can flow over said second baffle member into said third compartment and thus bypass said filtering device.